(12) United States Patent
Zhang et al.

(10) Patent No.: US 12,124,282 B2
(45) Date of Patent: Oct. 22, 2024

(54) INTENTION-DRIVEN REINFORCEMENT LEARNING-BASED PATH PLANNING METHOD

(71) Applicant: SOUTHEAST UNIVERSITY, Jiangsu (CN)

(72) Inventors: Hua Zhang, Jiangsu (CN); Na Su, Jiangsu (CN); Junbo Wang, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 17/923,114

(22) PCT Filed: Dec. 13, 2021

(86) PCT No.: PCT/CN2021/137549
§ 371 (c)(1),
(2) Date: Nov. 3, 2022

(87) PCT Pub. No.: WO2023/065494
PCT Pub. Date: Apr. 27, 2023

(65) Prior Publication Data
US 2024/0219923 A1    Jul. 4, 2024

(30) Foreign Application Priority Data

Oct. 18, 2021    (CN) .......................... 202111208888.4

(51) Int. Cl.
*G05D 1/644*    (2024.01)
*B63B 79/40*    (2020.01)
(Continued)

(52) U.S. Cl.
CPC ............. *G05D 1/644* (2024.01); *B63B 79/40* (2020.01); *G05D 2101/15* (2024.01); *G05D 2109/30* (2024.01)

(58) Field of Classification Search
CPC ............. G05D 1/644; G05D 2101/15; G05D 2109/30; B63B 79/40; H04L 45/08; H04W 40/32; H04W 4/38
See application file for complete search history.

(56) References Cited

U.S. PATENT DOCUMENTS 11,175,663 B1 *  11/2021  Johnson .................. B63B 79/40
2007/0269077 A1  11/2007  Neff et al.
(Continued)

FOREIGN PATENT DOCUMENTS

CN        111515932 A        8/2020
CN        112672307 A        4/2021
(Continued)

OTHER PUBLICATIONS

Machine Translation of CN-113190039 retrieved from Clarivate Analytics May 2024 (Year: 2024).*
(Continued)

*Primary Examiner* — Thomas Ingram
(74) *Attorney, Agent, or Firm* — MUNCY, GEISSLER, OLDS & LOWE, P.C.

(57) ABSTRACT

The present invention discloses an intention-driven reinforcement learning-based path planning method, including the following steps: 1: acquiring, by a data collector, a state of a monitoring network; 2: selecting a steering angle of the data collector according to positions of surrounding obstacles, sensor nodes, and the data collector; 3: selecting a speed of the data collector, a target node, and a next target node as an action of the data collector according to an ε greedy policy; 4: determining, by the data collector, the next time slot according to the selected steering angle and speed; 5: obtaining rewards and penalties according to intentions of the data collector and the sensor nodes, and updating a Q value; 6: repeating step 1 to step 5 until a termination state or a convergence condition is satisfied; and 7: selecting, by (Continued)

the data collector, an action in each time slot having the maximum Q value as a planning result, and generating an optimal path. The method provided in the present invention can complete the data collection path planning with a higher probability of success and performance closer to the intention.

9 Claims, 2 Drawing Sheets

(51) Int. Cl.
*G05D 101/15* (2024.01)
*G05D 109/30* (2024.01)

(56) References Cited

U.S. PATENT DOCUMENTS

| | | | | |
|---|---|---|---|---|
| 2020/0166928 | A1* | 5/2020 | Sudarsan | B64C 39/024 |
| 2021/0182718 | A1* | 6/2021 | Li | G07F 17/3225 |
| 2022/0139078 | A1* | 5/2022 | Murakoshi | G08G 5/0091 |
| | | | | 382/103 |
| 2022/0204055 | A1* | 6/2022 | Watterson | B60W 60/00276 |

FOREIGN PATENT DOCUMENTS

| | | |
|---|---|---|
| CN | 112866911 A | 5/2021 |
| CN | 113190039 A | 7/2021 |

OTHER PUBLICATIONS

Machine Translation of CN-112866911 retrieved from Clarivate Analytics May 2024 (Year: 2024).*
Wang et al., "UAV-assisted Cluster Head Election for a UAV-based Wireless Sensor Network," 2018 IEEE 6th International Conference on Future Internet of Things and Cloud, 2018, pp. 267-274, 8 pages.

* cited by examiner

INTENTION-DRIVEN REINFORCEMENT LEARNING-BASED PATH PLANNING METHOD

TECHNICAL FIELD

The present invention belongs to the field of wireless communication technologies, and in particular, to an intention-driven reinforcement learning-based path planning method.

BACKGROUND

With the development of the Internet of Things (IoT), wireless sensor networks are widely used for monitoring the surrounding environment, for example, for air pollution, marine resource detection, and disaster warning. IoT sensors generally have limited energy and limited transmission ranges. Therefore, data collectors are required to collect sensor data and further forward or process the sensor data. In recent years, as automatic control systems become increasingly intelligent and reliable, intelligent devices such as unmanned aerial vehicles (UAVs), unmanned ships, and unmanned submarines have been deployed in military and civilian applications for difficult or tedious tasks in dangerous or inaccessible environments.

Although the UAV, the unmanned ship, and the unmanned submarine can more easily complete data collection for monitoring networks as data collectors, they face the key challenge of limited energy. After departing from the base, the data collector needs to move toward sensor nodes, avoid collision with surrounding obstacles and sensor nodes, and return to the base within a specified time to avoid energy depletion. Therefore, a proper trajectory path is required to be designed for the data collector according to intentions of the data collector and sensor nodes, to improve the data collection efficiency of the monitoring network.

Most existing data collection path planning solutions take the intentions of the data collector and the sensor nodes into consideration separately without adjusting a data collection path according to the different intentions of the data collector and the sensor nodes. Moreover, the existing path planning methods do not take into consideration dynamic obstacles that appear and move randomly in the monitoring environment. Therefore, the existing path planning methods have low collection efficiency and reliability.

SUMMARY

In order to solve the above technical problems, the present invention provides an intention-driven reinforcement learning-based path planning method. In the method, intentions of a data collector and sensor nodes are expressed as rewards and penalties according to the real-time changing monitoring network environment, and a path of the data collector is planned through a Q-learning reinforcement learning method, so as to improve the efficiency and reliability of data collection.

An intention-driven reinforcement learning-based path planning method includes the following steps:
step A: acquiring, by a data collector, a state of a monitoring network;
step B: determining a steering angle of the data collector according to positions of the data collector, sensor nodes, and surrounding obstacles;
step C: selecting an action of the data collector according to an E greedy policy, where the action includes a speed of the data collector, a target node, and a next target node; step D: adjusting, by the data collector, a direction of sailing according to the steering angle and executing the action to the next time slot;
step E: calculating rewards and penalties according to intentions of the data collector and the sensor nodes, and updating a Q value;
step F: repeating step A to step E until the monitoring network reaches a termination state or Q-learning satisfies a convergence condition; and
step G: selecting, by the data collector, an action in each time slot having the maximum Q value as a planning result, and generating an optimal data collection path.

Further, the state S of the monitoring network in step A includes: a direction of sailing $\varphi[n]$ of the data collector in a time slot n, coordinates $q_u[n]$ of the data collector, available storage space $\{b_{am}[n]\}_{m \in M}$ of the sensor nodes, data collection indicators $\{w_m[n]\}_{m \in M}$ of the sensor nodes, distances $\{d_{um}[n]\}_{m \in M}$ between the data collector and the sensor nodes, and $\{d_{uk}[n]\}_{k \in K}$ distances between the data collector and the surrounding obstacles, where M is the set of sensor nodes, K is the set of surrounding obstacles, $w_m[n] \in \{0,1\}$ is a data collection indicator of the sensor node m, and $w_m[n]=1$ indicates that the data collector completes the data collection of the sensor node m in the time slot n, or otherwise indicates that the data collection is not completed.

Further, a formula for calculating the steering angle of the data collector in step B is:

$$\Delta[n+1] = \begin{cases} \min(\varphi_{up}[n] - \varphi[n], \varphi_{max}), & \varphi_{up}[n] \geq \varphi[n] \\ \max(\varphi_{up}[n] - \varphi[n], -\varphi_{max}), & \varphi_{up}[n] < \varphi[n] \end{cases}. \quad (1)$$

$\varphi_{up}[n]$ is a relative angle between the coordinates $q_u[n]$ of the data collector and a target position $p[n]$, and $\varphi_{max}$ is the maximum steering angle of the data collector.

Further, steps of determining the target position in step B include:
step B1: determining whether the data collector senses the obstacles, and comparing $\varphi_{m_1 o_1}[n]$ with $\varphi_{m_1 o_2}[n]$ in a case that the data collector senses the obstacles, where in a case that $\varphi_{m_1 o_1}[n] < \varphi_{m_1 o_2}[n]$, the target position of the data collector is $p[n]=p_{o_1}[n]$, or otherwise, the target position of the data collector is $p[n]=p_{o_2}[n]$, where $p_{o_1}[n]$ and $p_{o_2}[n]$ are two points on the boundary of surrounding obstacles detected by the data collector at the maximum sensing angle, and $\varphi_{m_1 o_1}[n]$ and $\varphi_{m_1 o_2}[n]$ are respectively relative angles between a target sensor node and the points $p_{o_1}[n]$ and $p_{o_2}[n]$;
step B2: determining whether the path $\overline{q_u[n]q_{m_2}}$ from the data collector to the next target node $m_2$ extends through a communication area $C_1$ of the target node $m_1$ in a case that the data collector does not sense the surrounding obstacles, where in a case that $\overline{q_u[n]q_{m_2}}$ does not extend through $C_1$, the target position is $p[n]=p_{c_1}[n]$, where $p_{c_1}[n]$ is a point in the communication area $C_1$ realizing the smallest distance $\|p_{c_1}[n]-q_u[n]\| + \|p_{c_1}[n]-q_{m_2}\|$; and
step B3: determining whether the path $\overline{q_u[n]q_{m_2}}$ extends through the safety area $C_2$ of the target node $m_1$ in a case that $\overline{q_u[n]q_{m_2}}$ extends through $C_1$, where in a case that $\overline{q_u[n]q_{m_2}}$ does not extend through $C_2$, the target position is $p[n]=q_{m_2}$, or otherwise the target position is $p[n]=p_{c_2}[n]$, where $p_{c_2}[n]$ is a point in the safety area $C_2$ realizing the smallest distance $\|p_{c_2}[n]-q_u[n]\|+\|p_{c_2}[n]-q_{m_2}\|$.

Further, a method for selecting the action according to the ε greedy policy in step C is expressed as:

$$a = \begin{cases} \arg\min_a Q(s, a), & \beta > \varepsilon \\ \text{random action}, & \beta \leq \varepsilon \end{cases}, \quad (2)$$

ε is an exploration probability, $\beta \in [0,1]$ is a randomly generated value, and $Q(s,a)$ is a Q value for executing the action a in a state of S.

Further, a formula for calculating the position in the next time slot of the data collector in step D is:

$$q_u[n] = (x_u[n-1] + v[n]\tau\cos\varphi[n], y_u[n-1] + v[n]\tau\sin\varphi[n]), \forall n, \quad (3)$$

$x_u[n-1]$ and $y_u[n-1]$ are respectively an x coordinate and a y coordinate of the data collector, $v[n]$ is a sailing speed of the data collector, and τ is duration of the each time slot.

Further, the rewards and penalties corresponding to the intentions of the data collector and the sensor nodes in step E are calculated as defined below:

step D1: in a case that the intention of the data collector is to safely complete the data collection of all sensor nodes with the minimum energy consumption $E_{tot}$ and return to a base within a specified time T and that the intention of the sensor nodes is to minimize overflow data $B_{tot}^s$, a reward $R_a(s,s')$ of the Q-learning is a weighted sum $\overline{\omega}E_{tot}+(1-\overline{\omega})B_{tot}^s$ of the energy consumption of the data collector and the data overflow of the sensor nodes, where s' is the next state of the monitoring network after an action a is executed in a state of S, and $\overline{\omega}$ is a weight factor; and step D2: according to the intentions of the data collector and the sensor nodes, the penalty of the Q-learning is $C_a(s,s')=\theta_{safe}+\theta_{bou}+\theta_{time}+\theta_{tra}+\theta_{ter}$, where $\theta_{safe}$ is a safety penalty, which means that distances between the data collector and the surrounding obstacles and between the data collector and the sensor nodes are required to satisfy an anti-collision distance; $\theta_{bou}$ is a boundary penalty, which means that the data collector is not allowed to exceed a feasible area; $\theta_{time}$ is a time penalty, which means that the data collector is required to complete the data collection within a time T; $\theta_{tra}$ is a traversal collection penalty, which means that data of all sensor nodes is required to be collected; and $\theta_{ter}$ is a termination penalty, which means that the data collector is required to return to a base within the time T.

Further, a formula for updating the Q value in step E is:

$$Q(s,a) \leftarrow (1-\alpha)Q(s,a) + \alpha\left[R_a(s,s') + C_a(s,s') + \gamma\min_{a'} Q(s',a')\right], \quad (4)$$

α is a learning rate, and γ is a reward discount factor.

Further, the termination state of the monitoring network in step F is that the data collector completes the data collection of the sensor nodes or the data collector does not complete the data collection at a time T, and the convergence condition of the Q-learning is expressed as:

$$|Q_j(s,a) - Q_{j-1}(s,a)| \leq \xi. \quad (5)$$

ξ is an allowable learning error, and j is a learning iteration number.

Further, the intention-driven reinforcement learning-based path planning method is applicable to unmanned aerial vehicles (UAVs)-assisted ground Internet of Things (IoT), unmanned ships-assisted ocean monitoring networks, and unmanned submarines-assisted seabed sensor networks.

An intention-driven reinforcement learning-based path planning method of the present invention has the following advantages:

Considering the intentions of the data collector and the sensor nodes, a data collection path planning method with coverage of all nodes is designed according to the random dynamic obstacles and the real-time sensed data in the monitoring environment. The Q-learning model optimizes the real-time coordinates of the data collector according to the current state information of the monitoring network, minimizes the intention difference, and improves the efficiency and reliability of data collection.

DETAILED DESCRIPTION

The following specifically describes an intention-driven reinforcement learning-based path planning method provided in the embodiments of the present invention with reference to the accompanying drawings.

Figure 1:
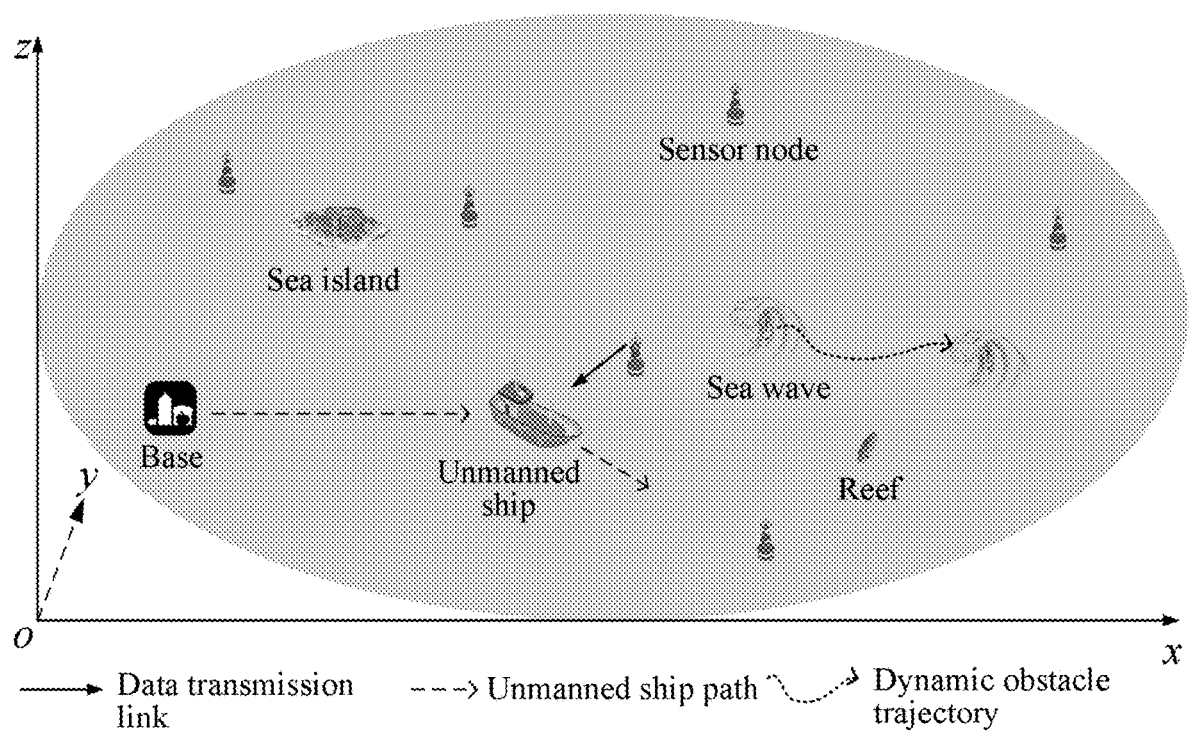
FIG. 1 is an exemplary scenario diagram according to the present invention.

FIG. 1 is an exemplary scenario diagram according to the present invention. Refer to FIG. 1.

A marine monitoring network includes one unmanned ship, M sensor nodes, and K obstacles such as sea islands, sea waves, and reefs. The unmanned ship sets out from a base, avoids collision with the obstacles and the sensor nodes, completes data collection of each sensor node within a specified time T, and returns to the base. In order to satisfy intentions of the unmanned ship and the sensor nodes, weighted energy consumption of the unmanned ship and data overflow of the sensor nodes are expressed as rewards for reinforcement learning, and a safety intention, a traversal collection intention, and an intention of returning to the base on time are expressed as penalties, to optimize a path of the unmanned ship by using a Q-learning method.

Figure 2:
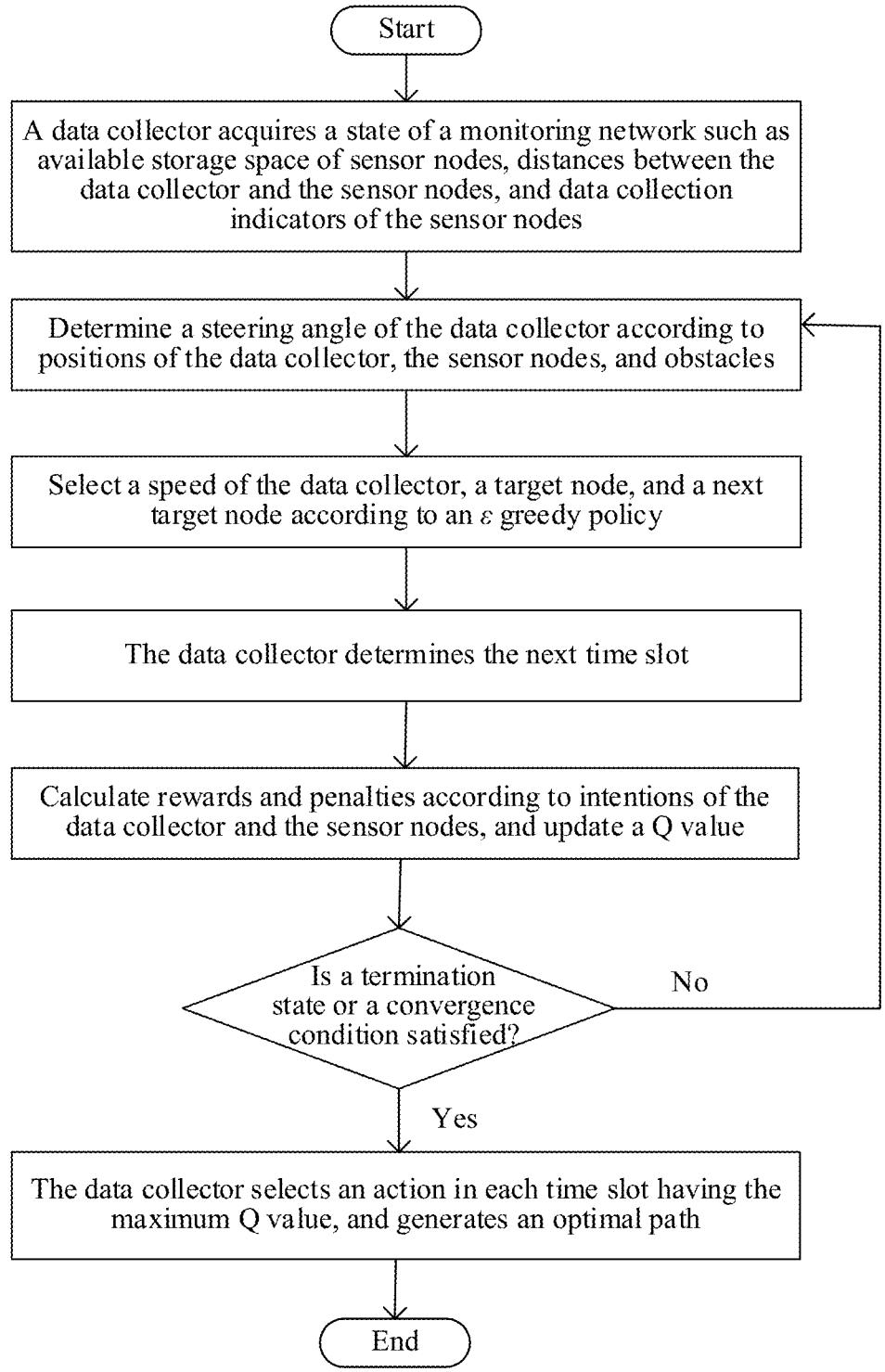
FIG. 2 is a schematic diagram of an implementation process according to the present invention.

FIG. 2 is a schematic diagram of an implementation process according to the present invention. Specific implementation processes are as follows:

Step I: A data collector acquires state information of a monitoring network, where the state information includes: a direction of sailing $\varphi[n]$ of the data collector in a time slot n, coordinates $q_u[n]$ of the data collector, available storage space $\{b_{am}[n]\}_{m\in M}$ of sensor nodes, data collection indicators $\{w_m[n]\}_{m\in M}$ of the sensor nodes, distances $\{d_{um}[n]\}_{m\in M}$ between the data collector and the sensor nodes, and $\{d_{uk}[n]\}_{k\in K}$ distances between the data collector and surrounding obstacles, where M is the set of sensor nodes, K is the set of surrounding obstacles, $w_m[n]\in\{0,1\}$ is a data collection indicator of the sensor node m, and $w_m[n]=1$ indicates that the data collector completes the data collection of the sensor node m in the time slot n, or otherwise indicates that the data collection is not completed.

Step II: Determine a steering angle of the data collector according to positions of the data collector, the sensor nodes, and the surrounding obstacles, including the following steps:

(1): determining whether the data collector senses the obstacles, and comparing $\varphi_{m_1 o_1}[n]$ with $\varphi_{m_1 o_2}[n]$ in a case that the data collector senses the obstacles, where in a case that $\varphi_{m_1 o_1}[n] < \varphi_{m_1 o_2}[n]$, the target position of the data collector is $p[n] = p_{o_1}[n]$, or otherwise, the target position of the data collector is $p[n] = p_{o_2}[n]$, where $p_{o_1}[n]$ and $p_{o_2}[n]$ are two points on the boundary of surrounding obstacles detected by the data collector at the maximum sensing angle, and $\varphi_{m_1 o_1}[n]$ and $\varphi_{m_1 o_2}[n]$ are respectively relative angles between a target sensor node and the points $p_{o_1}[n]$ and $p_{o_2}[n]$;

(2): determining whether the path $\overline{q_u[n] q_{m_2}}$ from the data collector to the next target node $m_2$ extends through a communication area $C_1$ of the target node $m_1$ in a case that the data collector does not sense the surrounding obstacles, where in a case that $\overline{q_u[n] q_{m_2}}$ does not extend through $C_1$, the target position is $p[n] p_{c_1}[n]$, where $p_{c_1}[n]$ is a point in the communication area $C_1$ realizing the smallest distance $\|p_{c_1}[n] - q_u[n]\| + \|p_{c_1}[n] - q_{m_2}\|$;

(3): determining whether the path $\overline{q_u[n] q_{m_2}}$ extends through the safety area $C_2$ of the target node $m_1$ in a case that $\overline{q_u[n] q_{m_2}}$ extends through $C_1$, where in a case that $\overline{q_u[n] q_{m_2}}$ does not extend through $C_2$, the target position is $p[n] = q_{m_2}$, or otherwise the target position is $p[n] = p_{c_2}[n]$, where $p_{c_2}[n]$ is a point in the safety area $C_2$ realizing the smallest distance $\|p_{c_2}[n] - q_u[n]\| + \|p_{c_2}[n] - q_{m_2}\|$; and (4) calculating the steering angle of the data collector by using the following formula:

$$\Delta[n+1] = \begin{cases} \min(\varphi_{up}[n] - \varphi[n], \varphi_{max}), & \varphi_{up}[n] \geq \varphi[n] \\ \max(\varphi_{up}[n] - \varphi[n], -\varphi_{max}), & \varphi_{up}[n] < \varphi[n] \end{cases}, \quad (6)$$

$\varphi_{up}[n]$ is a relative angle between the coordinates $q_u[n]$ of the data collector and a target position $p[n]$, and $\varphi_{max}$ is the maximum steering angle of the data collector.

Step III: Select an action of the data collector according to an ε greedy policy, where the action includes a speed of the data collector, a target node, and a next target node. A method for selecting the action according to the ε greedy policy is expressed as:

$$a = \begin{cases} \arg\min_a Q(s, a), & \beta > \varepsilon \\ \text{random action}, & \beta \leq \varepsilon \end{cases}, \quad (7)$$

ε is an exploration probability, $\beta \in [0,1]$ is a randomly generated value, and $Q(s,a)$ is a Q value for executing the action a in a state of S.

Step IV: The data collector adjusts a direction of sailing according to the steering angle and executing the action to the next time slot, where the coordinates of the data collector are expressed as:

$$q_u[n] = (x_u[n-1] + v[n]\tau \cos\varphi[n], y_u[n-1] + v[n]\tau \sin\varphi[n]), \forall n, . \quad (8)$$

$x_u[n-1]$ and $y_u[n-1]$ are respectively an X coordinate and a Y coordinate of the data collector, $v[n]$ is a sailing speed of the data collector, and τ is duration of the each time slot.

Step V: Calculate rewards and penalties according to intentions of the data collector and the sensor nodes, and updating a Q value by using the following formula:

$$Q(s, a) \leftarrow (1-\alpha)Q(s, a) + \alpha\left[R_a(s, s') + C_a(s, s') + \gamma \min_{a'} Q(s', a')\right]. \quad (9)$$

α is a learning rate, and γ is a reward discount factor.

The rewards and penalties are calculated as defined below:

(1): in a case that the intention of the data collector is to safely complete the data collection of all sensor nodes with minimum energy consumption $E_{tot}$ and return to a base within a specified time T and that the intention of the sensor nodes is to minimize overflow data $B_{tot}^s$, a reward $R_a(s,s')$ of the Q-learning is a weighted sum $\bar{\omega}E_{tot} + (1-\bar{\omega})B_{tot}^s$ of the energy consumption of the data collector and the data overflow of the sensor nodes, where s' is a next state of the monitoring network after an action a is executed in a state of S, and $\bar{\omega}$ is a weight factor; and (2): according to the intentions of the data collector and the sensor nodes, the penalty of the Q-learning is $C_a(s,s') = \theta_{safe} + \theta_{bou} + \theta_{time} + \theta_{tra} + \theta_{ter}$, where $\theta_{safe}$ is a safety penalty, which means that distances between the data collector and the surrounding obstacles and between the data collector and the sensor nodes are required to satisfy an anti-collision distance; $\theta_{bou}$ is a boundary penalty, which means that the data collector is not allowed to exceed a feasible area; $\theta_{time}$ is a time penalty, which means that the data collector is required to complete the data collection within a time T; $\theta_{tra}$ is a traversal collection penalty, which means that data of all sensor nodes is required to be collected; and $\theta_{ter}$ is a termination penalty, which means that the data collector is required to return to a base within the time T.

Step VI: Repeat step I to step V until the monitoring network reaches a termination state or Q-learning satisfies a convergence condition. The termination state is that the data collector completes the data collection of the sensor nodes or the data collector does not complete the data collection at a moment T, and the convergence condition of the Q-learning is expressed as:

$$|Q_j(s, a) - Q_{j-1}(s, a)| \leq \xi. \quad (10)$$

ξ is an allowable learning error, and j is a learning iteration number.

Step VII: The data collector selects an action in each time slot having the maximum Q value as a planning result, and generates an optimal data collection path.

The intention-driven reinforcement learning-based path planning method of the present invention is applicable to unmanned aerial vehicles (UAVs)-assisted ground Internet of Things (IoT), unmanned ships-assisted ocean monitoring networks, and unmanned submarines-assisted seabed sensor networks.

It may be understood that the present invention is described with reference to some embodiments, a person skilled in the art appreciate that various changes or equivalent replacements may be made to the embodiments of the present invention without departing from the spirit and scope of the present invention. In addition, with the teachings of the present invention, these features and embodiments may be modified to suit specific situations and materials without departing from the spirit and scope of the present invention. Therefore, the present invention is not limited by the specific embodiments disclosed below, all embodiments falling within the claims of this application shall fall within the protection scope of the present invention.

What is claimed is:

1. An intention-driven reinforcement learning-based path planning method, comprising the following steps:
   step A: acquiring, by a data collector, a state of a monitoring network;
   step B: determining a steering angle of the data collector according to positions of the data collector, sensor nodes, and surrounding obstacles;
   step C: selecting an action of the data collector according to an ε greedy policy, wherein the action comprises a speed of the data collector, a target node, and a next target node;
   step D: adjusting, by the data collector, a direction of sailing according to the steering angle and executing the action to the next time slot;
   step E: calculating rewards and penalties according to intentions of the data collector and the sensor nodes, and updating a Q value;
   step F: repeating step A to step E until the monitoring network reaches a termination state or Q-learning satisfies a convergence condition; and
   step G: selecting, by the data collector, an action in each time slot having the maximum Q value as a planning result, and generating an optimal data collection path.

2. The intention-driven reinforcement learning-based path planning method according to claim 1, wherein the state S of the monitoring network in step A comprises: a direction of sailing $\varphi[n]$ of the data collector in a time slot n, coordinates $q_u[n]$ of the data collector, available storage space $\{b_{am}[n]\}_{m \in M}$ of the sensor nodes, data collection indicators $\{w_m[n]\}_{m \in M}$ of the sensor nodes, distances $\{d_{um}[n]\}_{m \in M}$ between the data collector and the sensor nodes, and $\{d_{uk}[n]\}_{k \in K}$ distances between the data collector and the surrounding obstacles, wherein M is the set of sensor nodes, K is the set of surrounding obstacles, $w_m[n] \in \{0,1\}$ is a data collection indicator of the sensor node m, and $w_m[n]=1$ indicates that the data collector completes the data collection of the sensor node m in the time slot n, or otherwise indicates that the data collection is not completed.

3. The intention-driven reinforcement learning-based path planning method according to claim 1, wherein a formula for calculating the steering angle of the data collector in step B is:

$$\Delta[n+1] = \begin{cases} \min(\varphi_{up}[n] - \varphi[n], \varphi_{max}), & \varphi_{up}[n] \geq \varphi[n] \\ \max(\varphi_{up}[n] - \varphi[n], -\varphi_{max}), & \varphi_{up}[n] < \varphi[n] \end{cases} \quad (11)$$

$\varphi_{up}[n]$ is a relative angle between the coordinates $q_u[n]$ of the data collector and a target position $p[n]$, and $\varphi_{max}$ is the maximum steering angle of the data collector.

4. The intention-driven reinforcement learning-based path planning method according to claim 3, wherein steps of determining the target position in step B comprise:
   step B1: determining whether the data collector senses the obstacles, and comparing $\varphi_{m_1 o_1}[n]$ with $\varphi_{m_1 o_2}[n]$ in a case that the data collector senses the obstacles, wherein in a case that $\varphi_{m_1 o_1}[n] < \varphi_{m_1 o_2}[n]$, the target position of the data collector is $p[n]=p_{o_1}[n]$, or otherwise, the target position of the data collector is $p[n]=p_{o_2}[n]$, wherein $p_{o_1}[n]$ and $p_{o_2}[n]$ are two points on the boundary of surrounding obstacles detected by the data collector at the maximum sensing angle, and $\varphi_{m_1 o_1}[n]$ and $\varphi_{m_1 o_2}[n]$ are respectively relative angles between a target sensor node and the points $p_{o_1}[n]$ and $p_{o_2}[n]$;
   step B2: determining whether the path $\overline{q_u[n]q_{m_2}}$ from the data collector to the next target node $m_2$ extends through a communication area $C_1$ of the target node $m_1$ in a case that the data collector does not sense the surrounding obstacles, wherein in a case that $\overline{q_u[n]q_{m_2}}$ does not extend through $C_1$, the target position is $p[n]=p_{c_1}[n]$, wherein $p_{c_1}[n]$ is a point in the communication area $C_1$ realizing the smallest distance $\|p_{c_1}[n] - q_u[n]\| + \|p_{c_1}[n] - q_{m_2}\|$; and
   step B3: determining whether the path $\overline{q_u[n]q_{m_2}}$ extends through a safety area $C_2$ of the target node $m_1$ in a case that $\overline{q_u[n]q_{m_2}}$ extends through $C_1$, wherein in a case that $\overline{q_u[n]q_{m_2}}$ does not extend through $C_2$, the target position is $p[n]=q_{m_2}$, or otherwise the target position is $p[n]=p_{c_2}[n]$, wherein $p_{c_2}[n]$ is a point in the safety area $C_2$ realizing the smallest distance $\|p_{c_2}[n] - q_u[n]\| + \|p_{c_2}[n] - q_{m_2}\|$.

5. The intention-driven reinforcement learning-based path planning method according to claim 1, wherein a method for selecting the action according to the ε greedy policy in step C is expressed as:

$$a = \begin{cases} \arg\min_a Q(s,a), & \beta > \varepsilon \\ \text{random action}, & \beta \leq \varepsilon \end{cases} \quad (12)$$

ε is an exploration probability, $\beta \in [0,1]$ is a randomly generated value, and $Q(s,a)$ is a Q value for executing the action a in a state of S.

6. The intention-driven reinforcement learning-based path planning method according to claim 1, wherein a formula for calculating the position in the next time slot of the data collector in step D is:

$$q_u[n] = (x_u[n-1] + v[n]\tau\cos\varphi[n], y_u[n-1] + v[n]\tau\sin\varphi[n]), \forall n, \quad (13)$$

$x_u[n-1]$ and $y_u[n-1]$ are respectively an x coordinate and a y coordinate of the data collector, $v[n]$ is a sailing speed of the data collector, and τ is duration of the each time slot.

7. The intention-driven reinforcement learning-based path planning method according to claim 1, wherein the rewards and penalties corresponding to the intentions of the data collector and the sensor nodes in step E are calculated as defined below:
   step D1: in a case that the intention of the data collector is to safely complete the data collection of all sensor nodes with the minimum energy consumption $E_{tot}$ and return to a base within a specified time T and that the intention of the sensor nodes is to minimize overflow data $B_{tot}^s$, a reward $R_a(s,s')$ of the Q-learning is a weighted sum $\bar{\omega}E_{tot} + (1-\bar{\omega})B_{tot}^s$, of the energy consumption of the data collector and the data overflow of the sensor nodes, wherein s' is the next state of the monitoring network after an action a is executed in a state of S, and $\bar{\omega}$ is a weight factor; and
   step D2: according to the intentions of the data collector and the sensor nodes, the penalty of the Q-learning is $C_a(s, s') = \theta_{safe} + \theta_{bou} + \theta_{time} + \theta_{tra} + \theta_{ter}$, wherein $\theta_{safe}$ is a safety penalty, which means that distances between the data collector and the surrounding obstacles and between the data collector and the sensor nodes are required to satisfy an anti-collision distance; $\theta_{bou}$ is a boundary penalty, which means that the data collector is not allowed to exceed a feasible area; $\theta_{time}$ is a time penalty, which means that the data collector is required to complete the data collection within a time T; $\theta_{tra}$ is a traversal collection penalty, which means that data of all sensor nodes is required to be collected; and $\theta_{ter}$ is a termination penalty, which means that the data collector is required to return to a base within the time T.

8. The intention-driven reinforcement learning-based path planning method according to claim 1, wherein a formula for updating the Q value in step E is:

$$Q(s, a) \leftarrow (1 - \alpha)Q(s, a) + \alpha[R_a(s, s') + C_a(s, s') + \gamma \min_{a'} Q(s', a')], \quad (14)$$

$\alpha$ is a learning rate, and $\gamma$ is a reward discount factor.

9. The intention-driven reinforcement learning-based path planning method according to claim 1, wherein the termination state of the monitoring network in step F is that the data collector completes the data collection of the sensor nodes or the data collector does not complete the data collection at a moment T, and the convergence condition of the Q-learning is expressed as:

$$|Q_j(s, a) - Q_{j-1}(s, a)| \leq \xi \quad (15)$$

$\xi$ is an allowable learning error, and j is a learning iteration number.

* * * * *